(12) United States Patent
Yoon et al.

(10) Patent No.: US 6,850,668 B2
(45) Date of Patent: Feb. 1, 2005

(54) VARIABLE GROUP DELAY COMPENSATING UNIT AND VARIABLE GROUP DELAY COMPENSATING MODULE

(75) Inventors: Daeyoul Yoon, Tokyo (JP); Hiroshi Matsuura, Tokyo (JP); Tatsuya Hatano, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 277 days.

(21) Appl. No.: 10/100,220

(22) Filed: Mar. 15, 2002

(65) Prior Publication Data

US 2003/0108296 A1 Jun. 12, 2003

(30) Foreign Application Priority Data

Dec. 11, 2001 (JP) .......................................... 2001-377162

(51) Int. Cl.[7] .................................................. G02B 6/32
(52) U.S. Cl. .............................. 385/33; 385/47; 385/24; 385/27
(58) Field of Search ...................... 385/15–19, 24–27, 385/31–37, 41–42, 47; 359/124, 577, 615, 389; 372/32, 37

(56) References Cited

U.S. PATENT DOCUMENTS

| | | | | | |
|---|---|---|---|---|---|
| 3,739,295 | A | * | 6/1973 | Shah | 372/20 |
| 4,652,080 | A | * | 3/1987 | Carter et al. | 385/47 |
| 5,548,669 | A | * | 8/1996 | Anderson et al. | 385/19 |
| 5,649,037 | A | * | 7/1997 | Ohyama et al. | 385/24 |
| 5,930,045 | A | * | 7/1999 | Shirasaki | 359/577 |
| 6,188,705 | B1 | * | 2/2001 | Krainak et al. | 372/32 |
| 6,310,993 | B1 | * | 10/2001 | Cao et al. | 385/24 |

* cited by examiner

*Primary Examiner*—Gregory J. Toatley, Jr.
*Assistant Examiner*—Sang H. Nguyen
(74) *Attorney, Agent, or Firm*—Oblon, Spivak, McClelland, Maier & Neustadt, P.C.

(57) ABSTRACT

A variable group delay unit has a light multiple reflector for receiving incident light and generating output light at varied output angles depending on wavelengths, a light returning part for returning the output light to the light multiple reflector, and a slit member which is provided between the light multiple reflector and the light returning part. Only light of a necessary degree is transmitted through the slit member and is reflected to a light reflecting element. A method for designing an opening width of the slit member and a method for arranging the slit member are established.

12 Claims, 6 Drawing Sheets

PRIOR ART

VARIABLE GROUP DELAY COMPENSATING UNIT AND VARIABLE GROUP DELAY COMPENSATING MODULE

BACKGROUND OF THE INVENTION

1. Field of the Invention

The present invention relates to a variable group delay compensator, which is used for optical communication systems and optical measurement systems.

2. Description of the Related Art

Lately, a transfer system using a single wavelength cannot respond to recent optical communication in which the amount of information is excessively increased. Then, the optical communication uses a wavelength division multiplexing (WDM) system, in which light having a plurality of different wavelengths is intensity-modulated and is multiplexed to form wavelength division multiplexing light, and the formed wavelength division multiplexing light is transferred via a single optical fiber.

However, when signal light which is intensity-modulated is transferred in the optical fiber, propagation constants of the signal light are varied depending on wavelengths. Therefore, light dispersion in which propagation velocities are different depending on the wavelengths is caused in the signal light.

The signal light which is transferred in the optical fiber has a band including spectrum that is widened from a central wavelength of a channel thereof. As mentioned above, since the light dispersion is caused during the transfer of the signal light in the optical fiber, propagation velocities corresponding to spectrums in the channel are varied in a channel band and the signal light is outputted with a wave profile different from an incident wave profile.

When a transfer signal is converted into a digital signal and an optical signal which is intensity-modulated is transferred through the optical fiber, if a transfer distance is long, the propagation velocities are varied depending on the spectrums in the channel of the optical signal and the pulse width therefore becomes wide. Thus, adjacent pulses cannot be discriminated and, then, an error is easily caused. In particular, as the transfer speed of the signal light is higher, and a frequency interval between the adjacent pulses is narrower to increase a communication capacity of the optical fiber, the effect of the error is serious.

Accordingly, fast optical communication for a large capacity uses a first method in which the amount of dispersion of the optical fiber, as a transfer line, is reduced, or a second method in which a dispersion compensator having inverse characteristics of dispersion characteristics of the optical fiber is connected to the optical fiber and the dispersion characteristics of the optical fiber are compensated over a transfer wavelength band.

According to one example of the first method for reducing the amount of dispersion of the optical fiber, a dispersion shift fiber (DSF) having zero dispersion at a wavelength of 1.55 µm is used. According to one example of the second method using the dispersion compensator having the inverse characteristics of the dispersion characteristics of the optical fiber, a dispersion compensator using a dispersion compensation fiber (DCF) is adopted.

Further, another dispersion compensator (a variable group delay compensator) uses a light multiple reflector as disclosed in FIG. 13 of U.S. Pat. No. 5,930,045. Hereinbelow, a description is given of the dispersion compensator using the light multiple reflector as a conventional art of the present invention with reference to FIG. 8.

The conventional dispersion compensator (variable group delay compensator) comprises: an input/output light waveguide device 11 comprising an optical fiber 11a, a first lens 11b, a collimator lens, and a cylindrical lens; a light multiple reflector 14 including an incident plane 14a, a reflection plane 14b, and a transmission plane 14c, which are made of a glass, as basic materials, having parallel planes facing each other; a second lens 15 comprising a converging lens; and a mirror 16 in which a reflecting film is formed to have a reflectance of at least 90%. Incidentally, in the light multiple reflector 14, the reflection plane 14b is formed on one plane thereof and the transmission plane 14c is formed on an opposed plane of the reflection plane 14b.

First, wavelength division multiplexing light, which is incident on the incident plane 14a from the input/output light waveguide device 11, strikes to the transmission plane 14c. One part of the wavelength division multiplexing light is transmitted through the transmission plane 14c and another part is reflected thereto. Next, the wavelength division multiplexing light reflected from the transmission plane 14c strikes to the reflection plane 14b but not therethrough, and is reflected to the transmission plane 14c. One part of, the light which is reflected to the reflection plane 14b and is transmitted to the transmission plane 14c, is transmitted again and another part is reflected to the reflection plane 14b. In the light multiple reflector 14, the above-mentioned reflection to the reflection plane 14b and the transmission plane 14c is repeated and a part of the wavelength division multiplexing light is outputted to the second lens 15 every strike to the transmission plane 14c.

The wavelength division multiplexing light, which is emitted from the transmission plane 14c in varied directions depending on the wavelengths, is transmitted through the second lens 15 comprising a spherical lens. The wavelength division multiplexing light, which is transmitted through the second lens 15, is reflected at varied positions of a surface of the mirror 16 at varied angles depending on wavelength.

The wavelength division multiplexing light, which is reflected to the mirror 16, is transmitted again through the second lens 15, and is incident at varied positions with varied angles on the transmission plane 14c of the light multiple reflector 14. Thereafter, the wavelength division multiplexing light is repeatedly reflected to the reflection plane 14b and the transmission plane 14c, and is outputted from the incident plane 14a. The light outputted from the incident plane 14a is propagated through the input/output light waveguide device 11 and is outputted. That is, the wavelength division multiplexing (WDM) light is propagated in accordance with the above-mentioned order and is outputted after the group delay of the WDM light is compensated.

Consequently, according to a method for obtaining only the light having a specific wavelength belonging to the necessary degree, except for the light having a specific wavelength belonging to an order other than the necessary degree, the size of the mirror 16 is controlled as shown in FIG. 11.

For example, in FIG. 11, since the mirror 16 is formed with small size so as to limit a reflection area, the light having the wavelength $\lambda_{11}$ is reflected only at one position on the surface of the mirror 16. Thus, there is one optical path of the wavelength $\lambda_{11}$ but there are not plural optical paths thereof. As shown in FIG. 11, although the light of the wavelength $\lambda_{11}$ is outputted through two optical paths from the light multiple reflector 14, one beam is reflected to the mirror 16 and then is returned to the light multiple reflector 14 and another beam does not strike to the mirror 16 and is not reflected to the mirror 16. In other words, the light of the wavelength $\lambda_{11}$ has only one optical path. The above description can be applied to light of a wavelength $\lambda_{13}$.

However, the structure shown in FIG. 11 has a problem in that the arrangement of the mirror 16 is difficult.

Light of the central wavelength (corresponding to the specific wavelength $\lambda_{12}$ in FIG. 11) belonging to the order $m_1$ must be returned to the output position of the light multiple reflector 14 so as to compensate for the wavelength dispersion with the specific wavelength $\lambda_{12}$ as center and reduce the loss of the insertion. More specifically, mainly, angle adjustment is necessary at a reflecting point of the mirror 16 so as to return the light of the specific wavelength $\lambda_{12}$ to the output position of the light multiple reflector 14.

In the case of limiting the size of the mirror having the above-mentioned structure, there is a problem in that optical positioning is necessary to limit the height of the mirror.

SUMMARY OF THE INVENTION

Accordingly, it is an object of the present invention to provide an optical dispersion compensator in which positioning of optical axes is easy and a wavelength belonging to an unnecessary degree is removed.

According to an embodiment of the present invention, there is provided a variable group delay unit, comprising: a light multiple reflector for receiving incident light and generating output light at varied output angles depending on wavelengths; a light returning part for returning the output light to the light multiple reflector; and a slit member which is provided between the light multiple reflector and the light returning part.

DESCRIPTION OF THE PREFERRED EMBODIMENTS

Hereinbelow, one embodiment of variable group delay compensator (i.e., unit) of the present invention will be described with reference to FIG. 1.

Figure 1:
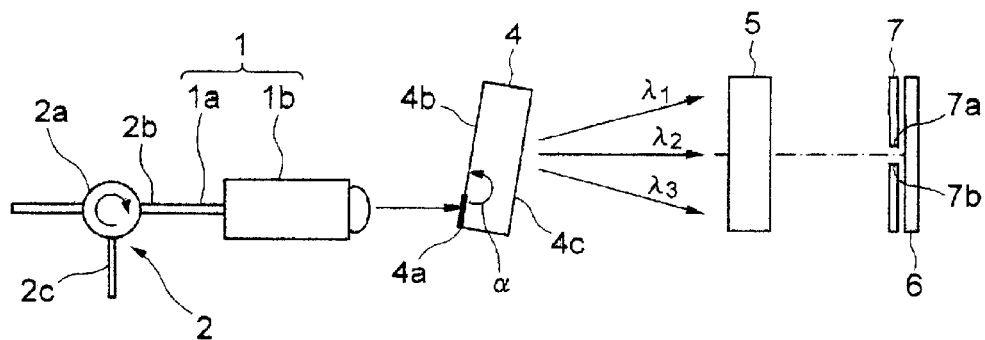
FIG. 1 is a diagram showing one example of the structure of a variable group delay compensator according to an embodiment of the present invention.

According to the embodiment of the invention, referring to FIG. 1, a variable group delay compensator comprises: an input/output light waveguide device 1 including an optical fiber 1a, and a first lens 1b having a collimator lens and a cylindrical lens; a light multiple reflector 4 having an incident plane 4a, a reflection plane 4b, and a transmission plane 4c, which are made of a glass as a basic material, having parallel planes facing each other; a second lens 5 comprising a converging lens; and a light returning part 6 comprising a mirror. A slit member 7 is arranged in the side of the second lens 5 near the right returning part.

Then, the optical fiber 1a is connected to a three port circulator 2. That is, one end of the optical fiber 1a is connected to the first lens 1b and another end thereof is connected to a port 2b of the three port circulator 2. Wavelength division multiplexing light is incident on the optical fiber 1a through a port 2a and the port 2b of the three port circulator 2, and is outputted to the light multiple reflector 4 from the first lens 1b. The wavelength division multiplexing light incident on the first lens 1b from the light multiple reflector 4 is outputted through the port 2b and a port 2c of the three port circulator 2.

The collimator lens forming the first lens 1b may be selected from a spherical lens, a graded-index lens (GRIN lens), an aspherical lens, and a multi-mode graded fiber lens. The cylindrical lens is not limited and may be an optical part having an operation for focusing a rod lens and an anamorphic prism pair or the like in line.

In the light multiple reflector 4, the reflection plane 4b comprises a reflection film having a reflectance of at least 90%, for example, to a set (i.e., prescribed) wavelength of the wavelength division multiplexing light. Incidentally, it is preferable that the reflection plane 4b has a reflectance of at least 99%. The transmission plane 4c comprises a reflection film having a reflectance of at least 60% to the set wavelength of the wavelength division multiplexing light. Incidentally, it is preferable that the transmission plane 4c has a reflectance of from 95% to 98%. In other words, one part of the wavelength division multiplexing light passes through the transmission plane 4c and remaining part is reflected to the reflection plane 4b.

The basic material forming the light multiple reflector 4 is not limited to the glass having parallel planes and may be a light multiple reflector having a reflection plane and a transmission plane, which planes sandwich a basic material made of a material transparent to signal light in parallel. The transparent material may be a crystalline quartz or crystal such as lithium niobate and, alternatively, atmospheric air or gas.

Figure 9:
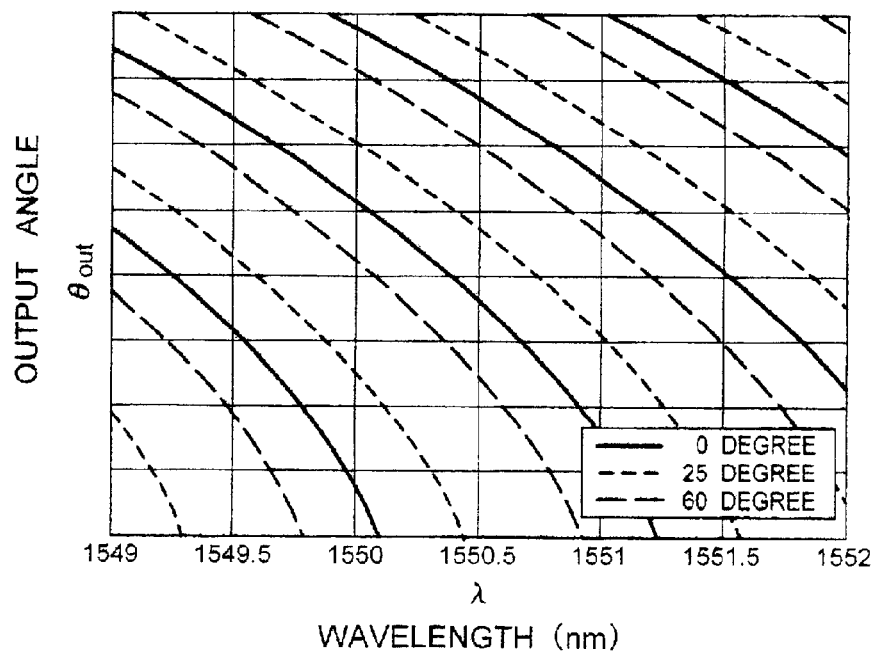
FIG. 9 is a graph showing the central wavelength and the output angle ($\lambda$, $\phi_{out}$) belonging to a specific order with using consecutive integral order m in the light multiple reflector having a basic material comprising a glass (BK7)

When the crystalline quartz is used as the transparent material in the light multiple reflector, a shifted amount of central wavelength and output angle ($\lambda$, $\phi_{out}$) to a long wavelength side is reduced. In general, the ($\lambda$, $\phi_{out}$) is shifted to a long wavelength side as the temperature rises, and to a short wavelength side as the temperature lowers. In addition, the shifted amount of the ($\lambda$, $\phi_{out}$) depends on the temperature difference ($\Delta$ T). More specifically, the output angle $\lambda_{out}$ depends on the temperature. FIG. 9 is a graph showing the central wavelength and the output angle ($\lambda$, $\phi_{out}$) belonging to a specific order with using consecutive integral order m in the light multiple reflector having a basic material comprising a glass (BK7). The continuous line shows the ($\lambda$, $\phi_{out}$) at the temperature 0° C., the dotted line shows the ($\lambda$, $\phi_{out}$) at the temperature 25° C., and the dotted long line shows the ($\lambda$, $\phi_{out}$) at the temperature 60° C. As is clear from FIG. 9, it is understood that the ($\lambda$, $\phi_{out}$) belonging to a specific order shifts to a long wavelength side in accordance with the temperature rise.

The amount of the shifting in the ($\lambda$, $\phi_{out}$) belonging to a specific order is different in the basic material of the light multiple reflector. In the light multiple reflector having the basic material comprising a glass (BK7), the amount of the shifting is about 0.014 nm/degree. In the light multiple reflector having the basic material comprising a quartz glass, the amount of the shifting is about 0.011 nm/degree.

Figure 10:
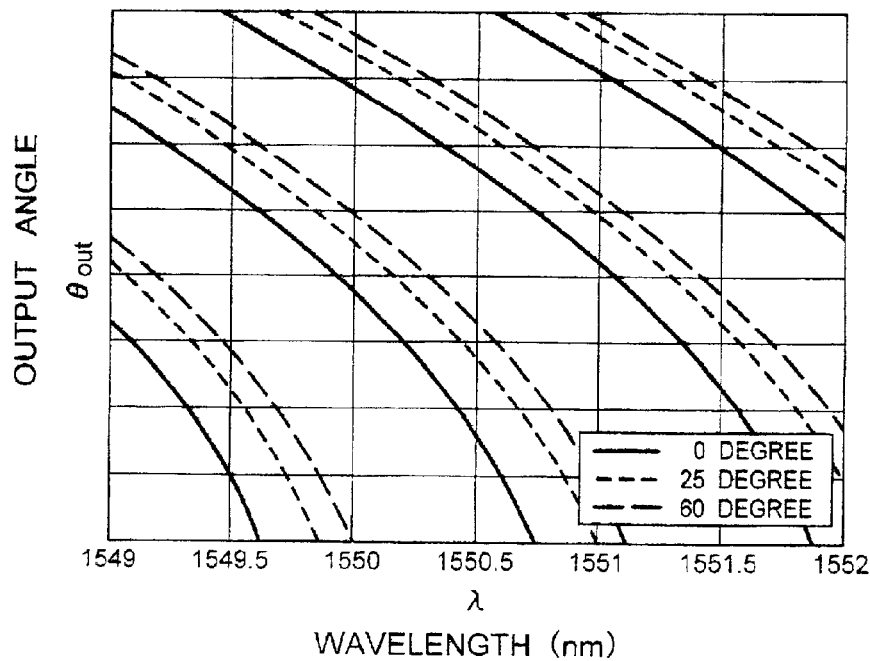
FIG. 10 is a graph showing the central wavelength and the output angle ($\lambda$, $\phi_{out}$) belonging to a specific order with using the same consecutive integral order m as that in FIG. 9 in the light multiple reflector having a basic material comprising a crystalline quartz.
Figure 11:
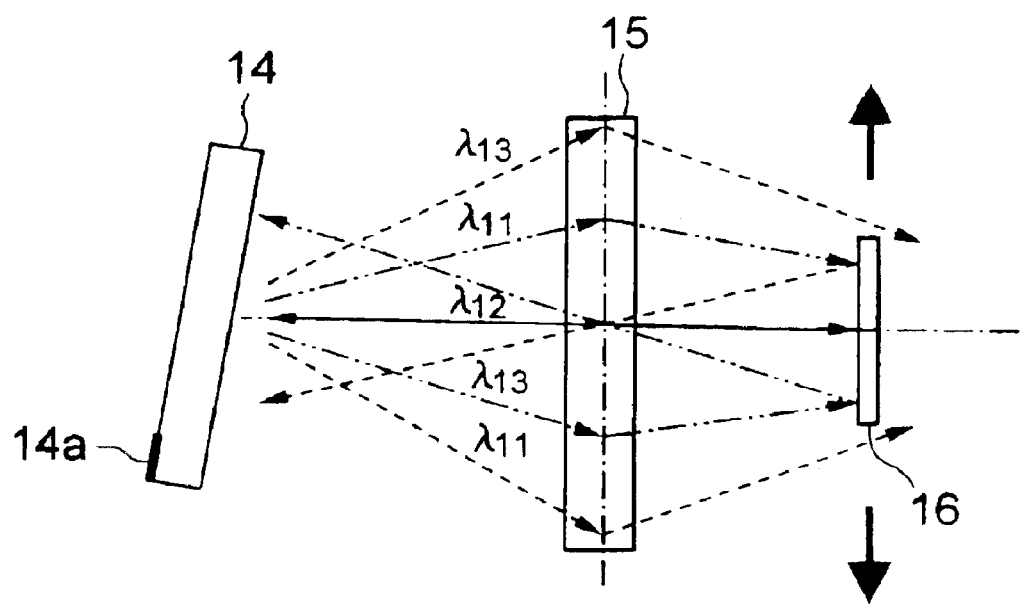
FIG. 11 is a diagram schematically showing the structure in which the size of a mirror is limited according to a modification of the conventional art shown in FIG. 8.

FIG. 10 is a graph showing the central wavelength and the output angle ($\lambda$, $\phi_{out}$) belonging to a specific order with using the same consecutive integral order m as that in FIG. 9 in the light multiple reflector having a basic material comprising a crystalline quartz. More specifically, the used wavelength is in the vicinity of 1550 nm, in addition, as the property of the crystalline quartz in the optical axis direction, the refractive index is 1.53, the temperature dependency of the refractive index is $-0.6 \times 10-5(1/° C.)$, and coefficient of linear expansion is $0.8 \times 10-5(1/° C.)$. As is clear from FIG. 10, when the crystalline quartz is used as the basic material in the light multiple reflector, a shifted amount of the ($\lambda$, $\phi_{out}$) to a long wavelength side becomes about 0.006 nm/degree, which is almost half of the shifted amount thereof in the case that the glass (BK7) or the quartz glass is used.

Thus, the light multiple reflector having the basic material comprising the crystalline quartz is less affected by the temperature change.

In the case of using the atmospheric air or gas as the transparent material, a material sandwiching it may be the solid material which is transparent to signal light and has parallel planes therewith. For example, glass corresponds to the above material. Appropriate selection, e.g., the adhesion or evaporation of a dielectric film can be performed so that the reflection plane or the transmission plane has a desired reflectance or transmittance.

Although the incident plane 4a of the light multiple reflector 4 has a reflection free film at a part of the reflection plane 4b as shown in FIG. 1, it may have an inclined plane. More specifically, it may have an inclined plane including an inner angle $\alpha$ ($\alpha=180°$ in FIG. 1) toward the transmission plane 4c at a part of the reflection plane 4b. Although the inner angle $\alpha$ ranges from 90 to 180°, preferably, it may range from 150 to 175°. Then, the incident plane 4a may has a reflection free film for the set wavelength of the wavelength division multiplexing light.

The light returning part 6 comprises a planar mirror, a cylindrical mirror, or the like. The mirror forming the light returning part 6 comprises a reflecting film having a reflectance of at least 90% to the set wavelength of the wavelength division multiplexing light.

Next, a description is given of the wavelength division multiplexing light which is outputted from the transmission plane 4c in the light multiple reflector 4.

The wavelength division multiplexing light, which is outputted from the transmission plane 4c in the light multiple reflector 4, has the same number of wavelengths, namely, a plurality of different wavelengths, in the case of being propagated through the input/output light waveguide device 1. The light outputted from the transmission plane 4c has a plurality of different wavelengths and is widened in a radial pattern in the same direction. A condition under which the light outputted from the transmission plane 4c is enhanced is given by the following equation (1) where a parallel interval between the reflection plane 4b and the transmission plane 4c in the light multiple reflector 4 is designated by d, a refractive index of the light multiple reflector 4 is designated by n, a wavelength is designated by $\lambda$, light is inputted to the reflection plane 4b and the transmission plane 4c in the light multiple reflector 4 at an angle $\theta$ in the vertical direction, and the order m is an integer.

$$2nd \cos \theta = m\lambda \quad (1)$$

Since the refractive index n and the parallel interval d have already been fixed in the light multiple reflector 4, if the order m is fixed, a specific angle $\theta_1$ which satisfies the equation (1) is determined with respect to the specific wavelength $\lambda_1$. Therefore, corresponding to a specific degree m, a light is enhanced in such manner that respective different wavelengths of wavelength division multiplexing light are corresponded one-to-one basis in specific plurality of different directions.

The positions and angles when the light returns to the transmission plane 4c in the light multiple reflector 4, are varied depending on the output angles from the transmission plane 4c. As compared with the light which returns to a position near the incident plane 4a on the transmission plane 4c, the light which returns to a position apart from the incident plane 4a is reflected between the transmission plane 4c and the reflection plane 4b in the light multiple reflector 4 more times. Consequently, the light which returns to the position apart from the incident plane 4a on the transmission plane 4c is propagated at a distance longer than that of the case of the light which returns to the position near the incident plane 4a on the transmission plane 4c. In other words, the light which is inputted from the incident plane 4a and is outputted again from the incident plane 4a, has varied optical path lengths depending on the wavelengths. Thus, a group delay is caused.

With the above arrangement, the light outputted from the light multiple reflector 4 has the reflected position on the mirror 6, which is determined depending on only the output angle of the light, irrespective of the position of the light outputted from the light multiple reflector 4.

Herein, it is assumed that the output angle (transmission angle) of the light from the transmission plane 4c in the light multiple reflector 4 is designated by $\phi_{out1}$, the reflection angle on the reflection plane 4b and the transmission plane 4c in the light multiple reflector 4 is designated by $\theta$, the wavelength of the output light is designated by $\lambda_1$, the refractive index of the light multiple reflector 4 is designated by n, and a distance between the transmission plane 4c and the reflection plane 4b, corresponding to a thickness, is designated by d.

With respect to the light having the wavelength $\lambda_1$, an equation of (n sin θ=sin $\phi_{out1}$) is satisfied according to the Snell's law. The following (2) equation is established based on the equation (n sin θ=sin$\phi_{out1}$) and the equation (1). Then, an integer m (=$m_1$) for satisfying the equation (2) is determined depending on the refractive index n, the distance d, the wavelength $\lambda_1$, and the output angle $\phi_{out1}$.

$$m\lambda_1 = 2nd\ \cos\{\sin^{-1}(1/n \cdot \sin\phi_{out1})\} \quad (2)$$

It is assumed that the order m is fixed to the integer $m_1$, a wavelength which is enhanced, corresponding to the order $m_1$, is designated by $\lambda$, and an output angle corresponding the wavelength $\lambda$ is designated $\phi_{out}$. One curve represented by a set ($\lambda$, $\phi_{out}$) through a coordinate ($\lambda_1$, $\phi_{out1}$) is determined based on the equation (2). Physically, this curve indicates innumerable number of sets ($\lambda$, $\phi_{out}$) having the enhanced wavelength $\lambda$ which satisfies the order $m_1$ and the output angle corresponding thereto $\phi_{out}$, in addition to the set ($\lambda_1$, $\phi_{out1}$).

Figure 2:
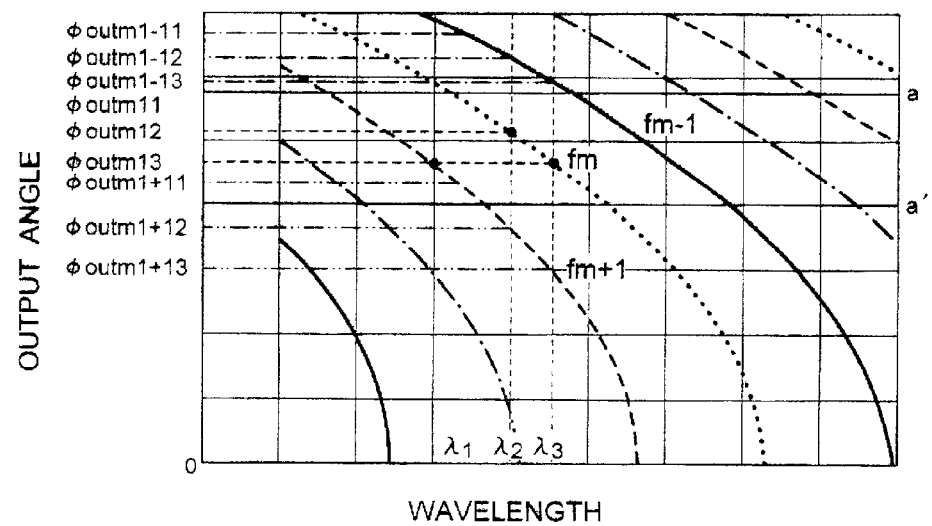
FIG. 2 is a graph showing a relationship between wavelengths belonging to degrees m+1, m, and m−1 and output angles from a transmission plane of a light multiple reflector.

There are degrees $m_{1\pm1}$, $m_{1\pm2}$, ... before and after the order $m_1$. The curve having the sets ($\lambda$, $\phi_{out}$) belonging to the orders is not through the point of the ($\lambda_1$, $\phi_{out1}$). FIG. 2 is a diagram schematically showing the curve having the sets ($\lambda$, $\phi_{out}$) belonging to the orders $m_{1+1}$, $m_1$, and $m_{1-1}$.

It is assumed that intersections between the curve having the sets ($\lambda$, $\phi_{out}$) belonging to the orders $m_{1+1}$, $m_1$, and $m_{1-1}$, and $\phi_{out1}$=0 are designated by $\lambda_{m1+1}$, $\lambda_{m1}$, and $\lambda_{m1-1}$, and then a relation of ($\lambda_{m1+1} < \lambda_{m1} < \lambda_{m1-1}$) is established. Generally, intersections ... $\lambda_{m1+2}$, $\lambda_{m1+1}$, $\lambda_{m1}$, $\lambda_{m1-1}$, $\lambda_{m1-2}$, ... between the curve having the sets ($\lambda$, $\phi_{out}$) belonging to the order m and the $\phi_{out1}$=0 have a relation of (... < ... < $\lambda_{m1+2}$ < $\lambda_{m1+1}$ < $\lambda_{m1}$ < $\lambda_{m1-1}$ < $\lambda_{m1-2}$ < ... < ...). As shown in FIG. 2, the curve having the sets ($\lambda$, $\phi_{out}$) in the center belongs to the order $m_1$, a curve on the left of the curve in the center belongs to the order $m_{1+1}$, and a curve on the right of the curve in the center belongs to the order $m_{1-1}$.

Referring to FIG. 2, on a curve having sets ($\lambda$, $\phi_{out}$) belonging to the orders $m_{1+1}$ and $m_{1-1}$, with respect to the wavelength $\lambda_1$ of the single light, having the output angle $\phi_{out1}$ on the curve of the order $m_1$, there are output angles $\phi_{out\ m1+1}$ and $\phi_{out\ m1-1}$ when the curve intersects to ($\lambda=\lambda_1$). In the consideration of the output angles, when the curve having sets ($\lambda$, $\phi_{out}$) belonging to innumerable number of degrees, intersect to ($\lambda=\lambda_1$), there are innumerable number of output angles when the curve intersects to ($\lambda=\lambda_1$).

According to the embodiment, with the structure in which the slit member 7 is arranged in front of the light returning part 6, light excluding the wavelength belonging to the necessary degree is cut off by the slit member 7. Further, according to the embodiment, the width of the opening of the slit member 7 which passes through the light having the wavelength belonging to the necessary degree is set.

Figure 3:
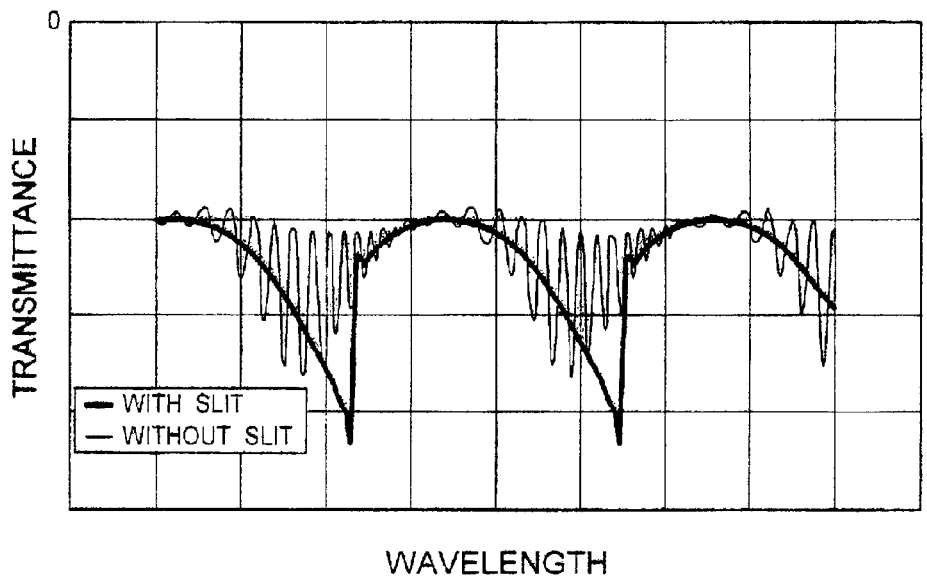
FIG. 3 is a graph of lines showing a relationship between wavelengths and transmittances, labeled without slit (according to a conventional art as shown in FIG. 8) and labeled with slit (according to the embodiment of the present invention as shown in FIG. 1)
Figure 4:
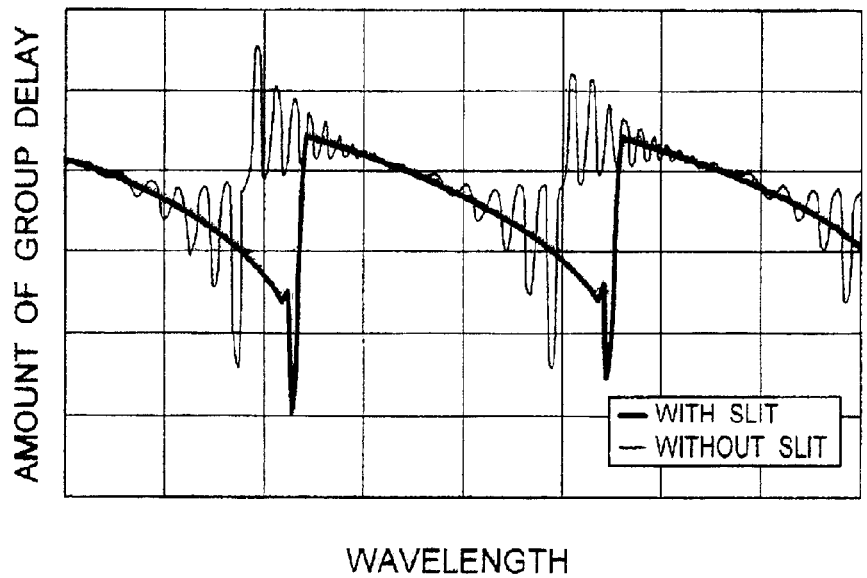
FIG. 4 is a graph of lines showing a relationship between wavelengths and the amount of delay, labeled without slit (according to the conventional art as shown in FIG. 8) and labeled with slit (according to the embodiment of the present invention as shown in FIG. 1)

FIGS. 3 and 4 are graphs of lines showing wavelength characteristics due to the group delay in a relationship between wavelengths and transmittances when the slit member 7 is not arranged in the structure according to the conventional art and when the slit member 7 is arranged according to the embodiment of the present invention. As will be understood with reference to FIGS. 3 and 4, when the slit member 7 is arranged, the lines show the transmittances without the noise and the group delay to the wavelengths. Because the light excluding the wavelength belonging to the necessary degree is cut off by the slit member 7 by appropriately setting the width of the opening of the slit member 7.

Next, a description is given of a method for determining the width of the opening of the slit member 7.

Generally, the order m which satisfies the equation (2) as the interference condition is uniquely determined depending on the parallel distance d between the reflection plane 4b and the transmission plane 4c, corresponding to the thickness of the light multiple reflector 4, the refractive index n of the light multiple reflector 4, the transmission (output) angle $\phi_{out}$, and the wavelength $\lambda$ of the light which is on the incident plane 4a.

However, in the case of using the given the parallel distance d, the refractive index n, and the transmission (output) angle $\phi_{out}$, the obtained degree m has a fraction. Therefore, the parallel distance d, the refractive index n, and the transmission (output) angle $\phi_{out}$, which can be adjusted on design, are set so that the fraction of the order m becomes smaller as much as possible.

As mentioned above, the integer m is determined depending on the given parallel distance d, the refractive index n, and the transmission (output) angle $\phi_{out}$. A interference degree, as an integer of approximately m, is determined depending on the order m as the integer and the given parallel distance d, the refractive index n, and the transmission (output) angle $\phi_{out}$.

It is assumed that the central wavelength of the wavelength $\lambda$ of the light corresponding the interference degree m is designated by $\lambda c$. A free spectral range FSR of the light multiple reflector 4 is given by (c/2nd cos{$\sin^{-1}$(1/n·sin $\phi_{out}$)}, where c denotes a light velocity. If the central wavelength $\lambda c$ is converted into a frequency fc, frequencies corresponding to the central wavelength of another interference degree are generated at intervals of the free spectral ranges FSR with the frequency fc as center. Incidentally, the transmission angle, namely, the output angle, corresponding to the central wavelength $\lambda c$ is $\phi c_{out}$.

The graph as shown in FIG. 2 is obtained by using the wavelength $\lambda$ and the transmission (output) angle $\phi_{out}$, as variables, in the equation (2) in which the thus-determined degree m and the orders m+1 and m−1 after/before the order m are fixed parameters. Curves having the sets ($\lambda$, $\phi_{out}$) corresponding to the orders m+1, m, and m−1 are designated by $f_{m+1}$, $f_m$, and $f_{m-1}$.

After determining the order m, the curves $f_{m+1}$, $f_m$, and $f_{m-1}$ having the sets ($\lambda$, $\phi_{out}$) corresponding to the orders m+1, m, and m−1, are specifically given curves.

The range of the output angle $\phi_{out}$ of the light multiple reflector 4 is selected in the graph of FIG. 2 showing the specifically given curves $f_{m+1}$, $f_m$, and $f_{m-1}$. In an area including the central wavelength $\lambda c$, an area of the output angle $\phi_{out}$, which intersects to the curve $f_m$ but not to the curves $f_{m+1}$ and $f_{m-1}$ in the case of setting the wavelength $\lambda$ of the light incident on the incident plane 4a to $\lambda_i$, can be set. Alternatively, in an area including the output angle scout corresponding to the central wavelength $\lambda c$, an area of the output angle $\phi_{out}$, which intersects to the curve $f_m$ but not to the curves $f_{m+1}$ and $f_{m-1}$ in the case of setting the output angle $\phi_{out}$ to $\phi_{out1}$, can be set.

The above-obtained range of the output angle $\phi_{out}$ corresponds to an angle range a to a' of the axis of the output angle $\phi_{out}$ shown in FIG. 2. The range of the wavelength $\lambda$ is determined to the area ranging a to a' of the output angle $\phi_{out}$. The set ($\lambda$, $\phi_{out}$) in the set area is used as the compensator for varying the group delay. Since only the output angle $\phi_{out}$ on the curve $f_m$ corresponding to the order m exists, with respect to the wavelength $\lambda$ in the set area, the light which causes the noise due to another degree can be shut off by cutting off the light other than the area of the output angle $\phi_{out}$ with the slit member 7.

In the above description, the order m is determined depending on the parallel distance d, the refractive index n, the transmission (output) angle $\phi_{out}$, and the wavelength $\lambda$. An interference degree M, which is approximately the order m, is determined, and a curve $f_M$ having the sets ($\lambda$, $\phi_{out}$) while using the order M as a parameter is specifically determined.

Next, algorithm for determining the curve $f_M$ will be described with reference to FIG. 7.

The curve $f_M$ using the order M as the parameter is specifically determined depending on the parallel distance d, the refractive index n, the output angle $\phi_{out}$, and the wavelength $\lambda c$. As shown in FIG. 7, curves $f_{M-1}$, $f_M$, and $f_{M+1}$ having the sets ($\lambda$, $\phi_{out}$), using degrees M−1, M, and M+1, as parameters, are indicated.

Figure 7:
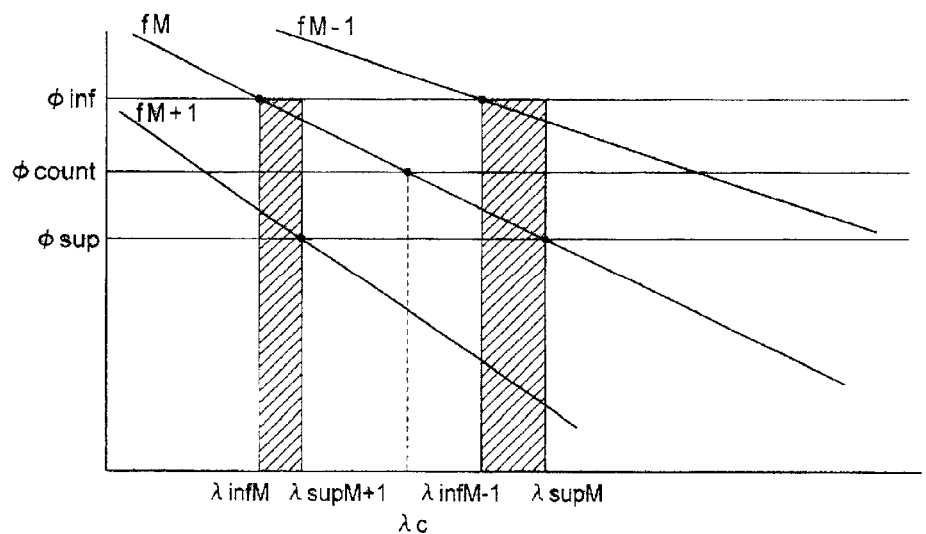
FIG. 7 is a diagram schematically showing a range of an output angle from the transmission plane of the light multiple reflector and a wavelength range in accordance therewith.
Figure 8:
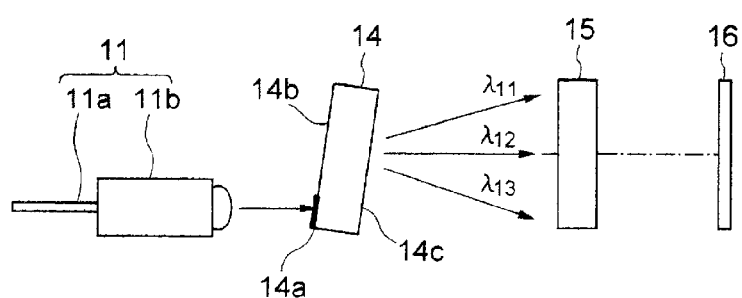
FIG. 8 is a diagram showing the structure of the conventional variable group delay compensator.

Referring to FIG. 7, the set ($\lambda c$, $\phi c_{out}$) is considered to be on the curve $f_M$ using the order M as the parameter. Therefore, it is assumed that the curve $f_{M-1}$ of the order M−1 exists on the right of the curve $f_M$ and the curve $f_{M+1}$ of the order M+1 exists on the left of the curve $f_M$.

An area of the output angle $\phi_{out}$ including the output angle $\phi c_{out}$ is previously set. The area of the output angle $\phi_{out}$ ranges from an output angle $\phi_{sup}$ smaller than $\phi c_{out}$ to an output angle $\phi_{inf}$ larger than $\phi c_{out}$. Wavelengths of intersections between the output angle $\phi_{inf}$ and the curves $f_M$ and $f_{M-1}$ are designated by $\lambda\inf_M$ and $\lambda\inf_{M-1}$. Wavelengths of intersections between the output angle $\phi_{sup}$ and the curves $f_M$ and $f_{M+1}$ are designated by $\lambda\sup_M$ and $\lambda\sup_{M+1}$.

If the wavelength $\lambda\inf_{M-1}$ is larger than the wavelength $\lambda\sup_M$, the upper limit of the wavelength $\lambda$ is determined by the wavelength $\lambda\sup_M$. If the wavelength $\lambda\inf_{M-1}$ is smaller than the wavelength $\lambda\sup_M$, the upper limit of the wavelength $\lambda$ is determined by the wavelength $\lambda\inf_{M-1}$. If the wavelength $\lambda\inf_M$ is larger than the wavelength $\lambda\sup_{M+1}$, the lower limit of the wavelength $\lambda$ is determined by the wavelength $\lambda\inf_M$. If the wavelength $\lambda\inf_M$ is smaller than the wavelength $\lambda\sup_{M+1}$, the lower limit of the wavelength $\lambda$ is determined by the wavelength $\lambda\sup_{M+1}$. An area of the output angle $\phi_{out}$ is determined depending on the output angle $\phi_{out}$ on the curve $f_M$ in the area of the determined wavelength $\lambda$.

In the above description, after setting the area of the output angle $\phi_{out}$ including the output angle $\phi c_{out}$, the area of the wavelength $\lambda$ including the central wavelength $\lambda c$ is set. However, the area of the wavelength $\lambda$ may previously be set and then the area of the output angle $\phi_{out}$ may be set. It is assumed that the area of the wavelength $\lambda$ ranges from the wavelength $\lambda\inf_M$ smaller than the wavelength $\lambda c$ to the wavelength $\lambda\sup_M$ larger than the wavelength $\lambda c$. The output angle $\phi_{out}$ at an intersection between the wavelength $\lambda\inf_M$ and the curve $f_M$ is designated by $\lambda_{inf}$ and the output angle $\phi_{out}$ at an intersection between the wavelength $\lambda\sup_M$ and the curve $f_M$ is designated by $\phi_{sup}$. The wavelength $\lambda$ at an intersection between the output angle $\phi_{inf}$ and the curve $f_{M-1}$ is designated by $\lambda\inf_{M-1}$, and the wavelength $\lambda$ at an intersection between the output angle $\phi_{sup}$ and the curve $f_{M+1}$ is designated by $\lambda\sup_{M+1}$.

If the wavelength $\lambda\inf_M$ is larger than the wavelength $\lambda\sup_M$, the upper limit of the wavelength $\lambda$ is determined by the wavelength $\lambda\sup_M$. If the wavelength $\lambda\inf_{M-1}$ is smaller than the wavelength $\lambda\sup_M$, the upper limit of the wavelength $\lambda$ is determined by the wavelength $\lambda\inf_{M-1}$. If the wavelength $\lambda\inf_M$ is larger than the wavelength $\lambda\sup_{M+1}$, the lower limit of the wavelength $\lambda$ is determined by the wavelength $\lambda\inf_M$. If the wavelength $\lambda\inf_M$ is smaller than the wavelength $\lambda\sup_{M+1}$, the lower limit of the wavelength $\lambda$ is determined by the wavelength $\lambda\sup_{M+1}$. An area of the output angle $\phi_{out}$ is determined depending on the output angle $\phi_{out}$ on the curve $f_M$ in the area of the determined wavelength $\lambda$.

These upper and lower limits are determined by previously setting the output angles $\phi_{inf}$ and $\phi_{sup}$.

Therefore, it is considered that in the area of the output angle $\phi_{out}$, the upper limit thereof is set to be larger than the output angle $\phi_{inf}$ and the lower limit thereof is set to be smaller than the output angle $\phi_{sup}$. If the wavelength $\lambda\inf_{M-1}$ is larger than the wavelength $\lambda\sup_M$, a new lower limit $\phi_{sup}'$, is set to be sufficiently smaller than the given output angle $\phi_{sup}$ so that a wavelength $\lambda\sup_M'$, at which the curve $f_M$ of the order M intersects to the output angle $\phi_{sup}'$, is larger than the wavelength $\lambda\inf_{M-1}$.

If the wavelength $\lambda_{supM+1}$ is smaller than the wavelength $\lambda\inf_M$, a new upper limit $\phi_{inf}'$ is set to be larger than the given output angle $\phi_{inf}$ so that a wavelength $\lambda\inf_M'$, at which the curve $f_M$ of the order M intersects to the output angle $\phi_{inf}'$, is smaller than the wavelength $\lambda\sup_{M+1}$.

As stated above, the area of the obtained output angle $\phi_{out}$ may be determined by changing the given ranges of the output angles $\phi_{inf}$ and $\phi$sup under the above-mentioned algorithm. When the set ($\lambda\sup_M$, $\phi_{inf}$) is on the curve $f_{M-1}$ and the set ($\lambda\inf_M$, $\phi_{sup}$) is on the curve $f_{M+1}$, the output angle is maximum between a maximum value of the obtained output angle $\phi_{inf}$ and a minimum value of the obtained output angle $\phi_{sup}$.

The method for setting the area of the wavelength $\lambda$ including the central wavelength $\lambda c$ and the area of the output angle $\phi_{out}$ including the output angle $\phi c_{out}$ has already been described. That is, the range of the output angle $\phi_{out}$ for cutting off the wavelength of the light as the noise, of the order other than the order M and the wavelength range in accordance therewith have been obtained with reference to FIG. 7.

Although the order M is distinguished from the order m, FIG. 7 shows the graph representing virtual curves $f_M$, $f_{M-1}$, and $f_{M+1}$. An actual graph shows the curves $f_{m+1}$, $f_m$, and $f_{m-1}$ indicating values which are specifically determined as the sets ($\lambda$, $\phi_{out}$) if the refractive index n, the parallel distance d, and the output angle $\phi c_{out}$ are given, and the actual graph is given as shown in FIG. 2.

In addition to the above description, in the area including the central wavelength $\lambda c$ of any desired degree Q and the area including the output angle $\phi_{out}$ including the output angle corresponding to the wavelength $\lambda$, the range of the output angle $\phi_{out}$ and the range of the wavelength corresponding thereto can be set to cut off the wavelength of the light as the noise, belonging to the order other than the order Q.

If the central wavelength $\lambda c$ of the order m is converted into the frequency fc, frequencies corresponding to the central wavelength of the interference degree other than the order m are generated at intervals of the FSR with the frequency fc as center. Therefore, if the wavelength of the light, corresponding to the central frequency of each channel of the wavelength division multiplexing signal light at equal frequency intervals, is equal to the central wavelength of the interference degree of the light multiple reflector 4, the range of the output angle $\phi_{out}$ and the range of the wavelength $\lambda$ in accordance therewith can be set to cut off the wavelength of the light as the noise, of the order other than the order belonging to another channel.

The design of the opening width of the slit member and the range of the output angle which does not cause the noise have been described. Hereinbelow, a description is given of the arrangement of the slit member for satisfying the output angle and the wavelength range and the structure of the opening width of the slit member. First, the arrangement of the slit member will be described.

Then, although not shown, in the compensator for varying the group delay, a distance between the light multiple reflector 4 and the second lens 5 can be varied and a distance between the second lens 5 and the slit member 7 arranged in front of the light returning part 6 is constant. It is assumed that the constant distance between the second lens 5 and the slit member 7 is equal to the focal distance f of the second lens 5. Incidentally, it is assumed that the output angle $\phi c_{out}$ of the central wavelength $\lambda c$ belonging to the order m is matched to the optical axis of the second lens 5.

The light returning part 6 and the opening plane of the slit member 7 are arranged in the vertical direction of the light having the output angle $\phi c_{out}$ of the central wavelength $\lambda c$ belonging to the order m. In this case, the wavelength of the light corresponding to the output angle $\phi_{out}$, from the light multiple reflector 4, forms an image on the light returning part 6 and the opening plane of the slit member 7. Two edge sides 7a and 7b forming the opening width of the slit member 7 are formed in parallel therewith. Preferably, the light having the output angle $\phi c_{out}$ passes through the center of the opening width of the slit member 7. In this setting, the light of the central wavelength belonging to the order m is propagated in the center of the opening width of the slit member 7. Therefore, a contact, at which a position coordinate space is matched to a wavelength space, can be given.

It is assumed that output angles of the light, which is cut off by the slit member 7 with the wavelength $\lambda c$ as center, are designated by $\phi a_{out}$ and $\phi b_{out}$ and wavelengths corresponding thereto are designated by $\lambda a$ and $\lambda b$. In this case, a group delay of a wavelength component of a certain channel from the wavelengths $\lambda a$ to $\lambda b$ is compensated.

It is also possible that the light having the output angle $\phi c_{out}$ is not propagated in the center of the slit member 7. Output angles of the light cut off by the slit member 7 are designated by $\phi d_{out}$ and $\phi e_{out}$ ($\phi d_{out} > \phi e_{out}$), and wavelengths corresponding thereto are designated by $\lambda d$ and $\lambda e$. For example, if the output angle $\phi d_{out}$ is near the output angle $\phi c_{out}$, the wavelength $\lambda c$ exists at a position deviated to the wavelength $\lambda d$. If the output angle $\phi e_{out}$ is near the output angle $\phi c_{out}$, the central wavelength $\lambda c$ exists at a position deviated to the wavelength $\lambda e$.

When light of the wavelength on the curve $f_m$ belonging to the order m determines the output angle $\phi_{out}$ which does not become the noise, as mentioned above, the wavelength range whose group delay is compensated corresponding to the output angle $\phi_{out}$ is determined. Within the wavelength range whose group delay is compensated, the central wavelength $\lambda c$ corresponding to the output angle $\phi c_{out}$ is in the center or is deviated on any one of the two edge sides.

Therefore, if a wavelength component longer than the central wavelength $\lambda c$ of the channel is compensated, wavelengths of the light having the output angles $\phi d_{out}$ and $\phi e_{out}$ ($\phi d_{out} > \phi e_{out}$), which are cut off by the slit member 7, are $\lambda d$ and $\lambda c$, respectively, and the slit member 7 may be arranged so that the output angle $\phi d_{out}$ is near the output angle $\phi c_{out}$.

If a wavelength component shorter than the central wavelength $\lambda c$ of the channel is compensated, wavelengths of the light having the output angles $\phi d_{out}$ and $\phi e_{out}$ ($\phi d_{out} > \phi e_{out}$) are $\lambda d$ and $\lambda e$, respectively, and the slit member 7 may be arranged so that output angle $\phi e_{out}$ is near the output angle $\phi c_{out}$.

Next, the setting of the opening width of the slit member 7 will be described as an example.

The distance between the second lens 5 and the slit member 7 is set to be the focal distance f of the second lens 5. Light outputted from any desired position of the light multiple reflector 4 is positioned on the opening plane of the slit member 7 by a product of the output angle $\phi_{out}$ and the focal distance f of the second lens 5. Then, this position is determined, irrespective of a distance between the light multiple reflector 4 and the second lens 5.

The method for setting the output angle from the light multiple reflector 4 is as mentioned above. Set output angles are designated by $\phi_A$ and $\phi_B$, and angles formed by the central axis of the second lens 5 and the output light at the output angles $\phi_A$ and $\phi_B$ are designated by $\Delta\phi_A$ and $\Delta\phi_B$. The positions on the slit member 7 of the light at the output angles $\Delta\phi_A$ and $\Delta\phi_B$ ($\phi_A > \phi_B$) is represented by (f×$\Delta\phi_A$) and (f×$\Delta\phi_B$) on the slit member 7, respectively. Thus, the opening width of the slit member 7 is f($\Delta\phi_A - \Delta\phi_B$)=f×($\phi_A - \phi_B$). If the distance between the light multiple reflector 4 and the second lens 5 is changed, the position and the opening width of the slit member 7 are not changed.

For example, it is assumed that an angle range between a to a' is 2° in FIG. 2 and the focal distance f of the second lens 5 is 12 mm. By setting the opening width of the slit member 7 to be 0.42 mm, the noise due to the wavelength other than that of the necessary degree m can be cut off.

Figure 5:
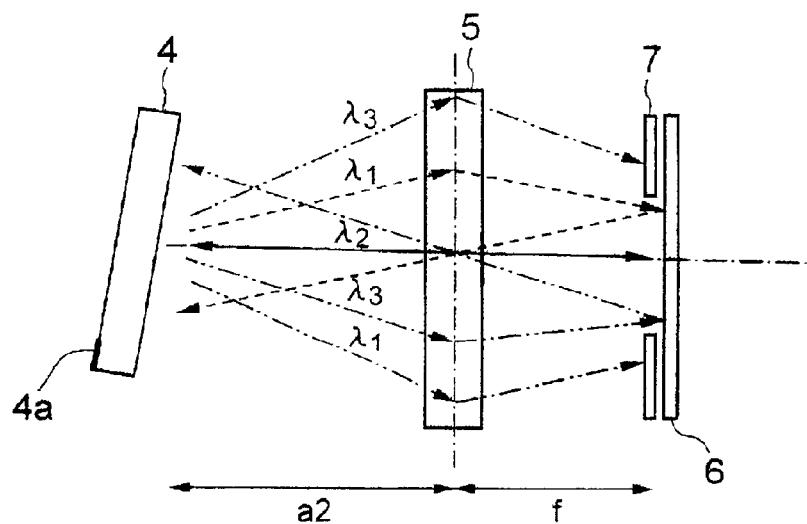
FIG. 5 is a diagram showing another example of the structure of the variable group delay compensator when a distance from a second lens to the light multiple reflector is longer than a focal distance of the second lens according to the embodiment.

FIG. 5 is a diagram showing optical paths of the wavelengths when the distance a2 from the center of the second lens 5 to the light multiple reflector 4 along the optical axis of the second lens 5 is sufficiently longer than the focal distance f of the second lens 5, and showing a case in which wavelengths $\lambda_3$ and $\lambda_1$ other than the wavelength of the necessary degree m, are cut off by the slit member 7.

Figure 6:
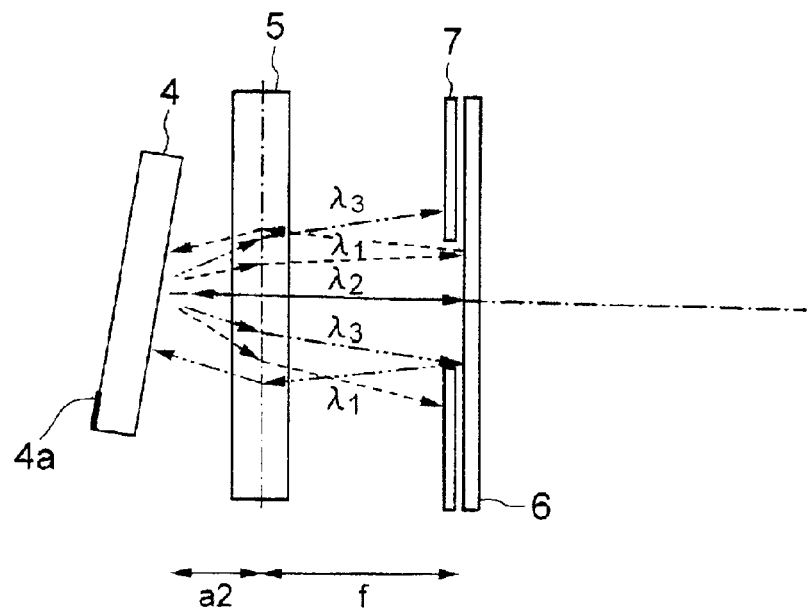
FIG. 6 is a diagram showing another example of the structure of the variable group delay compensator when the distance from the second lens to the light multiple reflector is shorter than the focal distance of the second lens according to the embodiment.

FIG. 6 is a diagram showing optical paths of the wavelengths when the distance a2 from the center of the second lens 5 to the light multiple reflector 4 along the optical axis of the second lens 5 is sufficiently shorter than the focal distance f of the second lens 5, and showing a case in which wavelengths $\lambda_3$ and $\lambda_1$ other than the wavelength of the necessary degree m, are cut off by the slit member 7.

Light having the wavelength cut off by the slit member 7 is reflected by the slit member 7, and becomes stray light in the compensator for varying the group delay, thus causing the noise. In order to solve the problem, the slit member 7 has a light absorbing film, to which a material for absorbing light is applied, on a front surface or a rear surface, or both the front surface and the rear surface thereof. More specifically, the slit member 7 can prevent the light reflection by forming the light absorbing film thereon. As a result, the noise due to the stray light can be removed. Incidentally, the material of the light absorbing film may be a black material such as inconell or carbon black.

Next, a method for controlling the amount of delay (the amount of dispersion wavelength) will be described.

By changing the distance between the light multiple reflector 4 and the second lens 5 while the distance between the second lens 5 and the light returning part 6, the amount of dispersion wavelength can be changed. Because the optical path lengths of the wavelengths are changed by changing the distance between the light multiple reflector 4 and the second lens 5, as will be understood with reference to FIGS. 9 and 10. The distance between the second lens 5 and the light returning part 6 is set to be equal to the focal distance f of the second lens 5.

The positive and the negative of the amount of dispersion are determined by the following inequalities (3) and (4).

$$f > a2 + a1/n \quad (3)$$

$$f < a2 + a1/n \quad (4)$$

Then, the focal distance of the second lens 5 is designated by f, the distance from the central optical axis of the second lens 5 to the light multiple reflector 4 along the optical axis thereof is designated by a2, the optical path length is designated by a1 when the light outputted from the light multiple reflector 4, which is incident on the optical axis of the second lens 5, is repeatedly reflected between the transmission plane 4c and the reflection plane 4b of the light multiple reflector 4 after the output light is focused on the transmission plane 4c of the light multiple reflector 4, in the case in which the light from the incident plane 4a is focused on the transmission plane 4c. If the light returning part 6 is a planar total-reflection mirror, the amount of dispersion is negative in the case of the inequality (3) and, it is positive in the case of the inequality (4) The amount of dispersion is proportional to $[f-(a2+a1/n)]$ when the light returning part 6 is the total reflection mirror. Therefore, the amount of dispersion can be changed by changing the distance between the light multiple reflector 4 and the center of the second lens 5 along the optical axis thereof.

Thus, the distance between the light multiple reflector 4 and the center of the second lens 5 along the optical axis thereof is changed, thereby changing the amount of dispersion or the positive and the negative of the amount of dispersion. Further, the positive and the negative of the amount of dispersion can be changed by changing the focal distance f of the second lens 5.

When the light returning part 6 is a mirror having a curvature radius R, the positive and the negative of the amount of dispersion are determined by the following inequalities (5) and (6).

$$f > a2 + a1/n - f^2/R \quad (5)$$

$$f < a2 + a1/n - f^2/R \quad (6)$$

In the case of the inequality (5), the amount of dispersion is negative and, in the case of the inequality (6), it is positive.

If the light returning part 6 is the mirror having the curvature radius R, the amount of dispersion is proportional to $[f-(a2+a1/n-f^2/R)]$ and, therefore, the amount of dispersion is changed by changing the distance a2 between the light multiple reflector 4 and the center of the second lens 5 along the optical axis thereof.

FIG. 9 is a diagram showing optical paths of the wavelengths, when the distance a2 between the light multiple reflector 4 and the center of the second lens 5 along the optical axis thereof is sufficiently longer than the focal distance f of the second lens 5.

FIG. 10 is a diagram showing optical paths of the wavelengths, when the distance a2 between the light multiple reflector 4 and the center of the second lens 5 along the optical axis thereof is sufficiently shorter than the focal distance f of the second lens 5.

Accordingly, the amount of dispersion or the positive and the negative of the amount of dispersion can be changed by changing the distance a2 from the center of the second lens 5 to the light multiple reflector 4 along the optical axis. The positive and the negative of the amount of dispersion can be changed by changing the focal distance f of the second lens 5.

In the conventional dispersion compensator which does not limit the size of the mirror, in the case of setting the dispersion to be approximately zero, the noise is caused in the wavelength of the necessary degree by the wavelength of the unnecessary degree. However, according to the present invention, it is possible to cut off the noise which is caused by the wavelength of the unnecessary degree by arranging the slit member in front of the light returning part.

According to the present invention, since the opening width and the arrangement of the slit member are determined to cut off the noise, it is exceedingly easy to cut off the noise the wavelength of the unnecessary degree.

Since the optical axis of the slit member is adjusted so that the center of the opening width of the slit member is matched to the light having the output angle $\phi c_{out}$, it is exceedingly easy to adjust the optical axis of the slit member.

Further, the material for absorbing light is applied to the slit member and the light due to the stray light is absorbed, thus certainly removing the noise.

According to the invention, since the light multiple reflector having a basic material comprising a crystalline quartz is used, a shifted amount of central wavelength and output angle $(\lambda, \phi_{out})$ to a long wavelength side may be remarkably reduced, thus the temperature dependency of the wavelength property in dispersion can be remarkably reduced.

What is claimed is:

1. A variable group delay compensating unit comprising:
   a light multiple reflector for receiving incident light having multiple wavelengths and generating output light at varied output angles depending on wavelengths of said incident light;
   a light returning part for returning said output light to said light multiple reflector; and
   a slit member which is provided between said light multiple reflector and said light returning part and configured to block a subset of said wavelengths as said subset of wavelengths impinge upon a blocking portion of said slit member that faces said light multiple reflector.

2. A variable group delay compensating unit as claimed in claim 1, wherein said slit member is arranged on a surface of said light returning part.

3. A variable group delay compensating unit as claimed in claim 1, which further comprises an input/output light waveguide device including a first lens for outputting light to said light multiple reflector and receiving light from said light multiple reflector, and a second lens arranged between said light returning part and said light multiple reflector.

4. A variable group delay compensating unit as claimed in claim 3, wherein said light returning part comprises a light reflecting element, and said second lens and said slit member are arranged between said light reflecting element and said light multiple reflector.

5. A variable group delay compensating unit as claimed in claim 4, wherein said slit member has an opening portion through which only output light of any desired wavelength is transmitted at a single output angle, from among light having different wavelengths, outputted from the light multiple reflector at different output angles.

6. A variable group delay compensating unit as claimed in claim 5, wherein the opening portion of said slit member is arranged in the direction vertical to a central light beam incident from said light multiple reflector.

7. A variable group delay compensating unit as claimed in claim 6, wherein light corresponding to a central frequency of a channel of wavelength division multiplexing signal light at equal frequency intervals is equal to the wavelength of the light outputted in the central light beam which is outputted from said light multiple reflector.

8. A variable group delay compensating unit, comprising:
   a light multiple reflector for receiving incident light and generating output light at varied output angles depending on wavelengths of said incident light;
   a light returning part for returning said output light to said light multiple reflector;

a slit member which is provided between said light multiple reflector and said light returning part; and an input/output light waveguide device including a first lens for outputting light to said light multiple reflector and receiving light from said light multiple reflector, and a second lens arranged between said light returning part and said light multiple reflector, wherein said light returning part comprises a light reflecting element, and said second lens and said slit member are arranged between said light reflecting element and said light multiple reflector, said slit member has an opening portion through which only output light of any desired wavelength is transmitted at a single output angle, from among light having different wavelengths, outputted from the light multiple reflector at different output angles, and a plurality of curves are formed by changing a wavelength $\lambda$ of the output light from the light multiple reflector, an output angle $\phi_{out}$, and an order m, under an interference condition of $$m\lambda = 2nd \cos[\sin^{-1}(1/n \cdot \sin\phi_{out})]$$

where n is a refractive index of the light multiple reflector and d is a thickness of the light multiple reflector, an area of the output angle $\phi_{out}$ is determined so that an intersection of any desired wavelength $\lambda$ and said plurality of curves is one or less, and an opening width of the slit member is determined by $[f \times (\phi_{outmax} - \phi_{outmin})]$ where $\phi_{outmax}$ is a maximum output angle, $\phi_{outmin}$ is a minimum output angle, and f is a focal distance of the second lens.

9. A variable group delay compensating unit comprising:

a light multiple reflector for receiving incident light and generating output light at varied output angles depending on wavelengths of said incident light;

a light returning part for returning said output light to said light multiple reflector;

a slit member which is provided between said light multiple reflector and said light returning part, and an input/output light waveguide device including a first lens for outputting light to said light multiple reflector and receiving light from said light multiple reflector, and a second lens arranged between said light returning part and said light multiple reflector, wherein said light returning part comprises a light reflecting element, and said second lens and said slit member are arranged between said light reflecting element and said light multiple reflector, said slit member has an opening portion through which only output light of any desired wavelength is transmitted at a single output angle, from among light having different wavelengths, outputted from the light multiple reflector at different output angles, the opening portion of said slit member is arranged in the direction vertical to a central light beam incident from said light multiple reflector, light corresponding to a central frequency of a channel of wavelength division multiplexing signal light at equal frequency intervals is equal to the wavelength of the light outputted in the central light beam which is outputted from said light multiple reflector, and the equal frequency interval of said wavelength division multiplexing light is equal to a free spectral range $c/2nd \cos[\arc\sin(1/n \cdot \sin\phi_{out})]$ of the light multiple reflector, where c is a light velocity.

10. A variable group delay compensating unit as claimed in claim 9, wherein a light absorbing film for absorbing wavelength division multiplexing light is applied to at least one surface of said slit member, said surface facing to the second lens.

11. A variable group delay compensating unit as claimed in claim 10, wherein said light absorbing film is inconell or carbon black.

12. A variable group delay compensating unit as claimed in any one of claims 1, 3, 4, 5, 8, 6, 7 and 9, wherein said light multiple reflector has a reflection plane and a transmission plane, which planes sandwiching in parallel a basic material comprising a crystalline quarts transparent to signal light.

* * * * *